(No Model.) 4 Sheets—Sheet 1.
H. G. O'NEILL.
CASH REGISTER, INDICATOR, AND CHECK PRINTER.
No. 480,124. Patented Aug. 2, 1892.
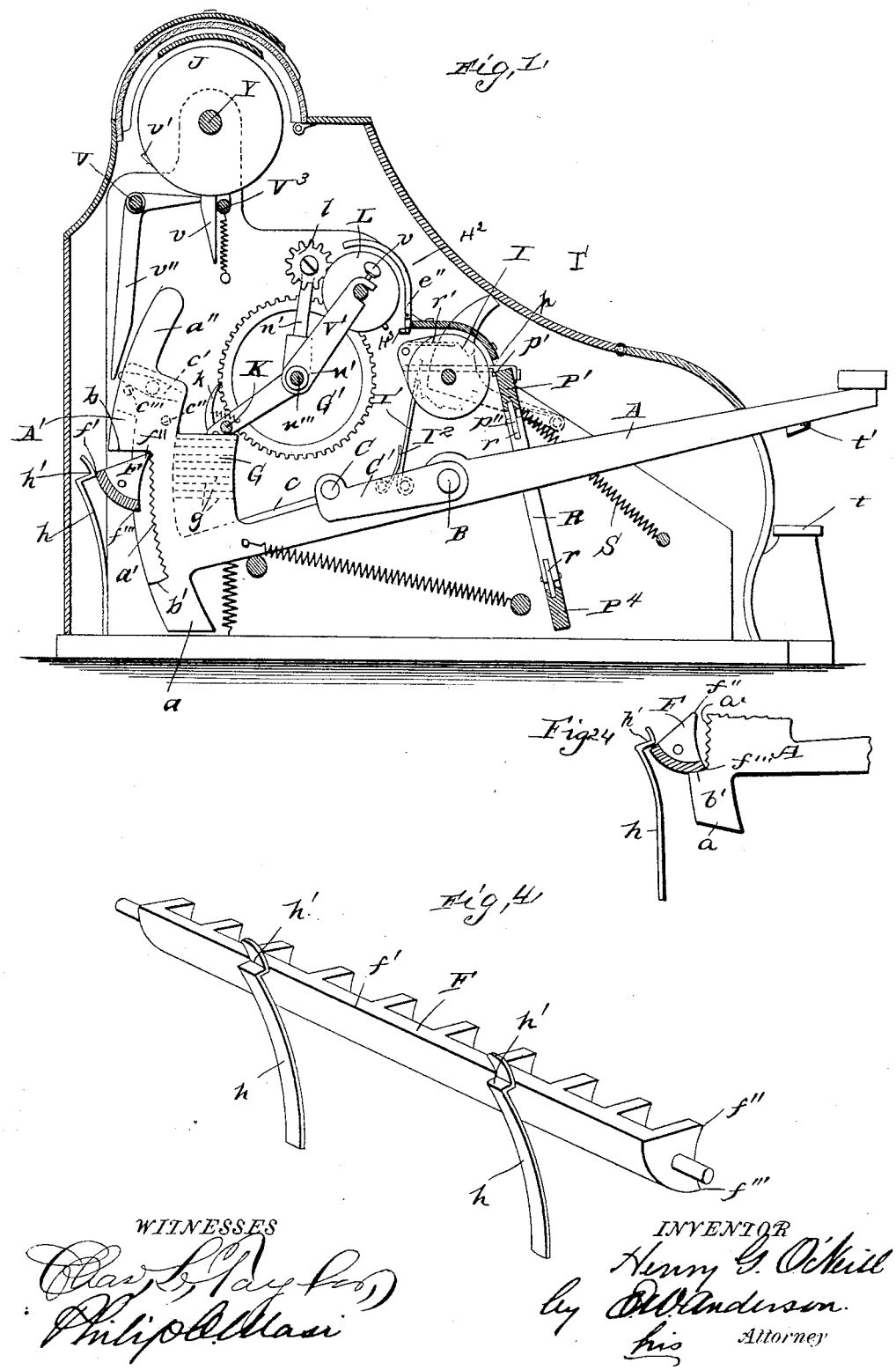

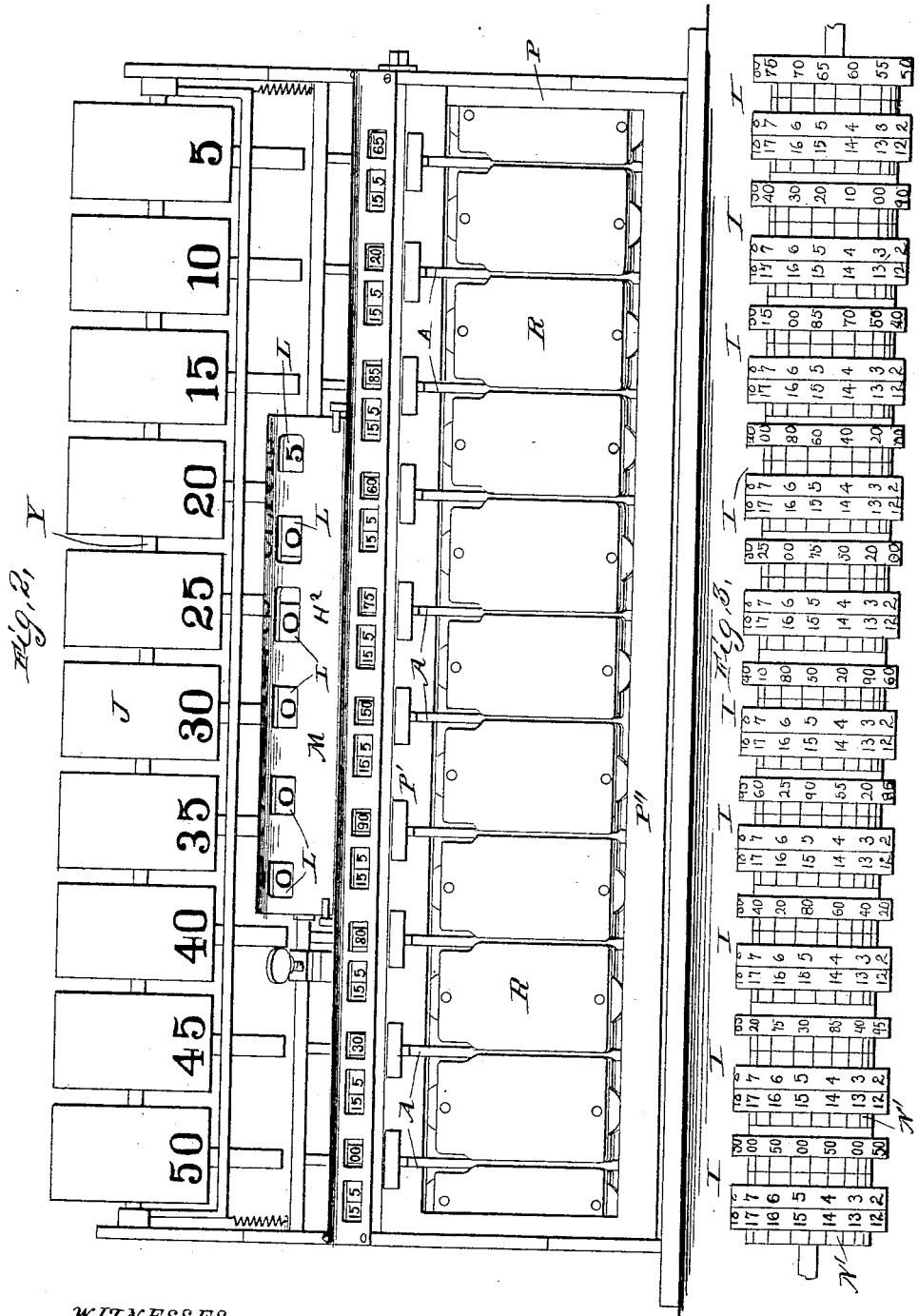

(No Model.) 4 Sheets—Sheet 3.
H. G. O'NEILL.
CASH REGISTER, INDICATOR, AND CHECK PRINTER.
No. 480,124. Patented Aug. 2, 1892.
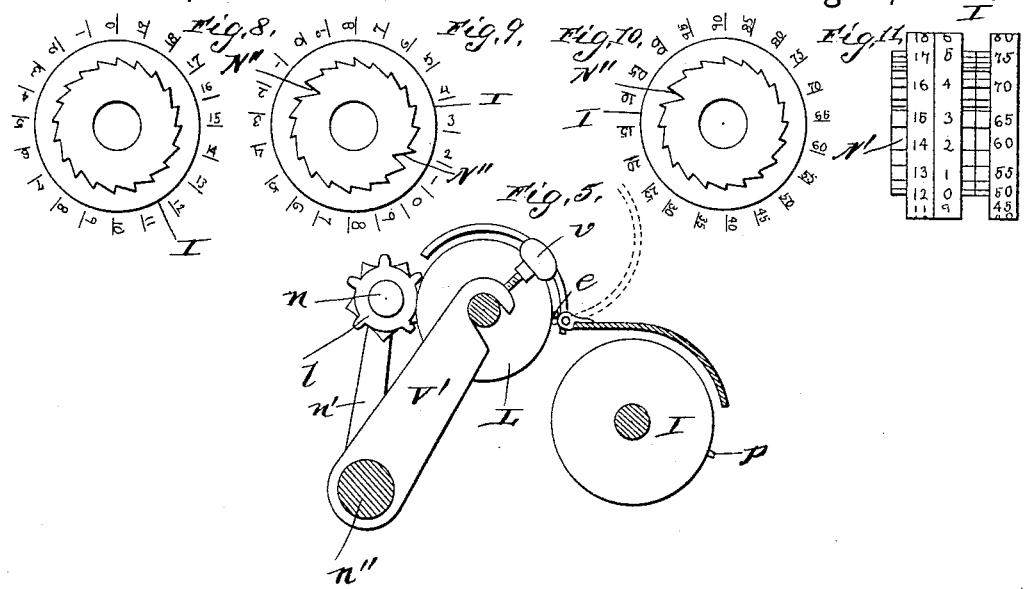
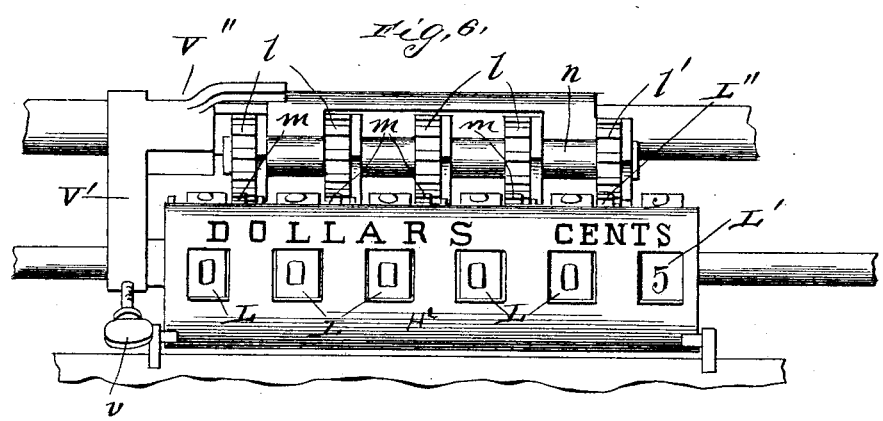
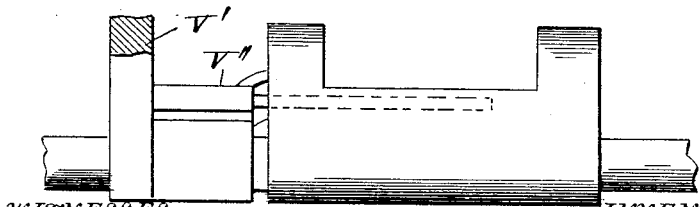
WITNESSES  
INVENTOR  
Henry G. O'Neill  
by O. W. Anderson  
his Attorney (No Model.) 4 Sheets—Sheet 4.
H. G. O'NEILL.
CASH REGISTER, INDICATOR, AND CHECK PRINTER.
No. 480,124. Patented Aug. 2, 1892.
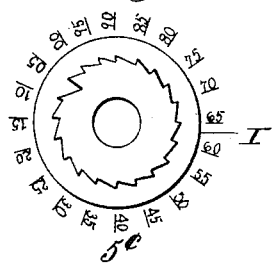
Fig. 12.
5¢
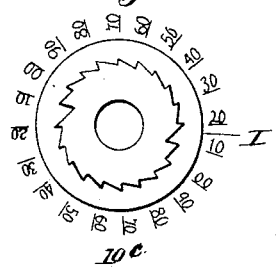
Fig. 13.
10¢
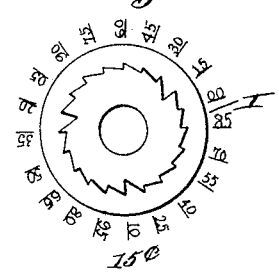
Fig. 14.
15¢
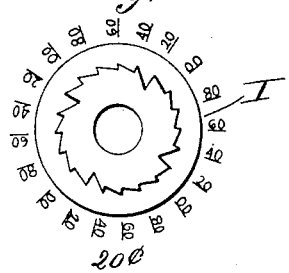
Fig. 15.
20¢
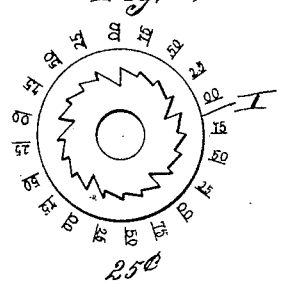
Fig. 16.
25¢
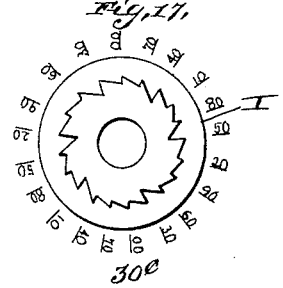
Fig. 17.
30¢
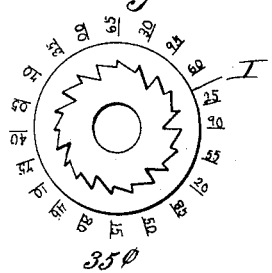
Fig. 18.
35¢
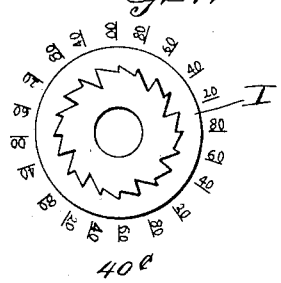
Fig. 19.
40¢
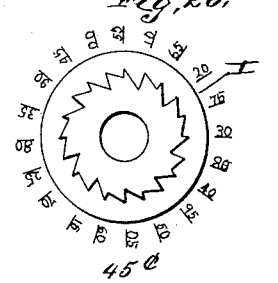
Fig. 20.
45¢
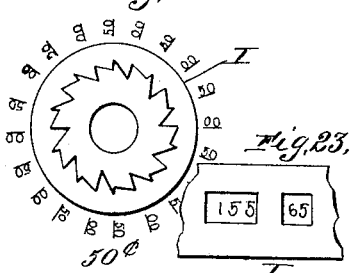
Fig. 21.
50¢
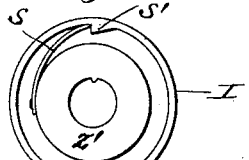
Fig. 22.
Fig. 23.
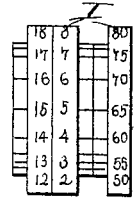
WITNESSES
INVENTOR
Henry G. O'Neill
by O.W. Andrum,
his Attorney
THE NORRIS PETERS CO., PHOTO-LITHO., WASHINGTON, D. C.

UNITED STATES PATENT OFFICE.

HENRY G. O'NEILL, OF LOUISVILLE, KENTUCKY, ASSIGNOR TO THE STANDARD REGISTER COMPANY, OF BOSTON, MASSACHUSETTS.

CASH REGISTER, INDICATOR, AND CHECK-PRINTER.

SPECIFICATION forming part of Letters Patent No. 480,124, dated August 2, 1892.

Application filed November 5, 1891. Serial No. 410,984. (No model.)

*To all whom it may concern:*

Be it known that I, HENRY G. O'NEILL, a subject of the Queen of Great Britain, and a resident of Louisville, in the county of Jefferson and State of Kentucky, have invented certain new and useful Improvements in Cash-Registers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a vertical transverse section. Fig. 2 is a front elevation. Fig. 3 is a detail view of numbered wheels. Fig. 4 is a detail view of pawl and springs. Fig. 5 is an enlarged detail view of numbered wheel, adding-wheel, the pinion, and attachments. Fig. 6 is a detail view of adding mechanism. Fig. 7 is a detail view of part of adding mechanism. Figs. 8, 9, 10, 11, 12, 13, 14, 15, 16, 17, 18, 19, 20, and 21 are detail views of the numbered wheels. Fig. 22 is a detail view of numbered wheel, showing inner face. Fig. 23 is a detail view of same, showing the arrangement of the wheel with reference to case enlarged. Fig. 24 is a detail view showing the continuous pawl in its reversed position, in connection with a portion of a key-lever.

This invention has relation to accounting-machines or cash-registers, and particularly to improvements upon a machine for which my application for Letters Patent, under Serial No. 411,088, filed November 6, 1891, is now pending and differs therefrom in the following particulars.

In the said application I employed a series of independent triangular pawls, in connection with each key-lever, for insuring its proper stroke. In the present application a continuous triangular pawl-bar is employed, pivoted at its ends in the frame, this construction being preferred for the reasons hereinafter specified.

In the said application the series of sets of individual itemizing numeral-wheels were arranged to indicate the number of operations of each key. In the present case multiplying-wheels are employed, so arranged that they will indicate the cash value of the total operations of each key.

This invention further differs in the stop devices used in connection with the adding-wheels.

The invention consists in the novel construction and combination of parts, all as hereinafter set forth.

In the accompanying drawings, the letter A designates a series of key-levers pivoted at B and having their inner ends A' of curved or arc form, as shown, said ends terminating below in a projection $a$, designed to engage the floor of the case or a bar thereof to hold the keys in normal position. The rear curved edge of the end A' is provided with an arc ratchet $a'$ between an upper trip shoulder or projection $b$ and a lower trip shoulder or projection $b'$. In the upper angles of the keys, between their shanks or levers and their curved ends, are the cam lugs or projections G, having horizontal cam-edges $g$ of different heights, designed to actuate the bail-lever of the adding mechanism. At the upper portion of the arc-shaped end A' of each key is an oblique upward finger or projection $a''$, having a rounded end and extending within a short distance of the indicating-disk J above it, said disk having an arm $v$, extending downward in front of the finger $a''$, designed to be engaged thereby when the key is actuated. The series of keys A are preferably pivoted alongside of each other on a horizontal rod B, at the end portions of which are also pivoted the angle-arms $c\ c$ of a trip-frame C', which carries a horizontal bar C, which rests on all the key-levers when in normal position. The angle-arms $c\ c$ extend as far as the arc-shaped ends A' of the keys, and thence extend upward to the lever of the lower portions of the fingers or projections $a''$ of the ends of said key-levers. At the upper end of each arm $c$ is pivoted on its lateral face a short bar $c'$, which vibrates on the stop pins or projections $c''$ and $c'''$, also on said arm, and designed to limit the vibratory movements of the bar. When the bar $c'$ is at rest in its normal position, its operating end projects sufficiently in rear to engage and actuate the pendent arm $v''$ of a pawl-bar V to effect a disengagement of any one of the indicating-wheels, so that it shall return to its normal position. Springs are provided to return the keys to their normal positions after operation. This trip-frame and devices are fully shown and described in my application, Serial No. 411,088, above referred to.

The key-levers are provided with finger-pieces at their front ends, which are marked with figures in multiples of five to indicate five cents, ten cents, and fifteen cents, and so on up to forty cents, preferably, and a key to indicate one dollar may also be used. The indicating-disks are also marked with the figures "5," "10," "15," &c., to correspond with the keys which actuate said disks. The upper projections G of the keys are of greater or less height, according to the value of the keys, in order to insure proper movement of the operating-bail bar of the adding mechanism. For instance, the operation of the fifty-cent key must move the bail-bar through a greater arc than that of the five-cent key in order to turn the large gear-wheel G' the distance to actuate properly the first pinion of the adding mechanism at M. At the same time, through the use of the projections G, the construction provides for a uniform movement of the keys at their finger ends.

In rear of the edge ratchets of the arc-shaped ends of the key-levers is arranged a continuous triangular or double pawl F, as shown in Fig. 4 of the annexed drawings, extending throughout or equal in length to the space occupied by the entire row of keys. This continuous triangular or double pawl is used, preferably, to the series of double pawls, as shown in a previous application, Serial No. 411,088, filed November 6, 1891, for a similar purpose, the objects of the present arrangement being to render the machine more substantial, to reduce the number of parts, and to facilitate the adjustment. This bar-pawl is pivoted in the frame of the machine or in suitable supports at each side. The rear angle $f'$ of this pawl projects sufficiently to engage the springs $h$, which are each provided with an angular end $h'$, adapted to hold the pawl in an elastic or yielding manner, whether its upper tooth $f''$ or its lower tooth $f''''$ be in engagement with the ratchet of the key-lever.

The shoulders or trip projections $b\,b'$ at the ends of the ratchet serve to reverse the double pawl, which prevents the backward movement until the entire stroke of the key is attained in either direction. When the key is in normal position, the upper tooth $f''$ is in engagement with the ratchet. As the key is depressed the ratchet moves upward under the pawl-tooth; but cannot move back or downward until its lower trip-shoulder $b'$ engages the lower tooth $f''''$ of the double pawl and turns the pawl to bring it into engagement with the ratchet, at the same time releasing the ratchet from the upper tooth of the pawl.

It is apparent that the arc-ratchets and double pawl-bar may be located near the front of the series of key-levers; but the position shown in rear is preferred.

When a key-lever is operated, its cam-lug G engages the bail-lever K, which extends transversely over, and is therefore common to all the key-levers, to move by means of its pawl $k$ the toothed wheel G', through an arc corresponding in its number of teeth to the amount marked on the key. The series of adding-wheels are shown at L L', and their carrying-pinions at $l\,l'$ in rear thereof. The first wheel L' of the series of adding-wheels is marked with the figures "5" and "0" alternately around its periphery, while the succeeding wheels of the series are marked with the digits "1" to "9," inclusive, and "0." Each of these digit-wheels L L' is provided with an adjoining toothed wheel L'', with which the carrying pinion in rear engages. From the flange or side of the first wheel L' extends a spur-like tooth $e$ beyond the periphery between the "0" and the "5." Each of the other digit-wheels is provided with one spur-like projection similar to that just referred to and extending between the 9 and 0 marks beyond the periphery of the wheels. These wheels have toothed wheels $m$ attached thereto for engagement with the carrying-pinions $l\,l'$, which are carried upon a shaft $n$, having arms $n'$ pivoted at $n''$.

$H^2$ is a curved plate having a hinged support and in which are the sight-openings through which the numbers on the adding-wheels may be read. This plate has at its lower edge a continuous inwardly-turned rib or flange $H^3$, which is normally beyond the reach of the stop-pins $l''$ on the peripheries of the adding-wheels. When, however, said wheels are to be reset to their zero position, this plate is turned away from the said wheels, as indicated in Fig. 5 in dotted lines, which brings the rib or flange $H^3$ into such position that it will be engaged by the stop-pin $l''$ as the latter are turned by revolving the shaft upon which the wheels are mounted. When all the wheels have been turned until the stop-pin engages said flange, they are reset to "0," as their 0-marks are designed to be located in the proper relative position to said pins.

The carrying-wheels are mounted in a pivoted frame V'', which is provided with an arm V', notched to engage the shaft of the adding-wheels and secured thereto by a set-screw $v$, to be loosened when the frame is to be thrown back to disengage the carrying-wheels. A beaded or corrugated surface is provided around the adding-wheels by means of which they may be turned by hand till the cipher-mark appears at the sight-slot, as in Fig. 6. When the adding-wheels are reduced to a common starting-point, they are ready for a new series of operations, and the carrying-wheels are turned into engagement with their gearing, the stop-bar being by this action removed out of the path of their stop-pins.

In order to show the multiplied transactions of each key, instead of the number of its operations, as appears in the previous application referred to, provide a set of three or more numbered wheels I, which are actuated by a forked pawl I', connected to the key-lever and held to its work by a spring I''. These wheels I are placed side by side on a common shaft and are marked around their periphery as follows: The first wheel of the series of three for the five-cent key will be marked as appears in Fig. 12—viz., into twenty parts: "00, 05, 10, 15, 20, 25, 30, 35, 40, 45, 50, 55, 60, 65, 70, 75, 80, 85, 90, 95;" the first wheel of the series for the ten-cent key, as appears in Fig. 13—viz., "00, 10, 20, 30, 40, 50, 60, 70, 80, 90, 00, 10, 20, 30, 40, 50, 60, 70, 80, 90;" the first wheel of the series for the fifteen-cent key, as appears in Fig. 14—viz., "00, 15, 30, 45, 60, 75, 90, 05, 20, 35, 50, 65, 80, 95, 10, 25, 40, 55, 70, 85;" the first wheel of the series for the twenty-cent key, as in Fig. 15—viz., "20, 40, 60, 80, 00, 20, 40, 60, 80, 20, 40, 60, 80, 00, 20, 40, 60, 80, 00;" the first wheel of the series for the twenty-five-cent key, as in Fig. 16—viz., "25, 50, 75, 00, 25, 50, 75, 00, 25, 50, 75, 00, 25, 50, 75, 00, 25, 50, 75, 00;" the first wheel of the series for the thirty-cent key, as in Fig. 17—viz., "30, 60, 90, 20, 50, 80, 10, 40, 70, 00, 30, 60, 90, 20, 50, 80, 10, 40, 70, 00;" the first wheel of the series for the thirty-five-cent key, as in Fig. 18—viz., "35, 70, 05, 40, 75, 10, 45, 80, 15, 50, 85, 20, 55, 90, 25, 60, 95, 30, 65, 00;" the first wheel of the series for the forty-cent key, as in Fig. 19—viz., "40, 80, 20, 60, 00, 40, 80, 20, 60, 00, 40, 80, 20, 60, 00, 40, 80, 20, 60, 00;" the first wheel of the series for the forty-five-cent key, as in Fig. 20—viz., "45, 90, 35, 80, 25, 70, 15, 90, 05, 50, 95, 40, 85, 39, 75, 20, 65, 10, 55, 00;" the first wheel of the series for the fifty-cent key, as in Fig. 21—viz., "50, 00, 50, 00, 50, 00, 50, 00, 50, 00, 50, 00, 50, 00, 50, 00, 50, 00, 50, 00."

The numbering on the first of the wheels of the series for the other keys beyond fifty cents in multiples of five up to ninety-five cents, inclusive, will be according to the following rule, demonstrated on the previous ten keys: Starting with the number corresponding to the denomination of the key, add to it a similar amount, and each time to the sum add this number. When the sum equals or exceeds a dollar, omit the dollar, simply marking the wheel or either the required ciphers or the cents remaining over, and continue this system out till you shall have placed twenty marks around the periphery of the wheel. All the second wheels of each series for all keys are numbered alike, thus: into twenty parts: "0, 1, 2, 3, 4, 5, 6, 7, 8, 9, 0, 1, 2, 3, 4, 5, 6, 7, 8, 9," as in Fig. 9. All the third wheels of each series for all keys are numbered alike, thus: into twenty parts: "0, 1, 2, 3, 4, 5, 6, 7, 8, 9, 10, 11, 12, 13, 14, 15, 16, 17, 18, 19." On one side of each wheel and between each set, as they are arranged side by side, is attached a toothed wheel N', and the other side of each wheel is provided with a hollowed wall having within it a spring s, connected to the inner disk z', secured to said shaft and adapted to engage an interior shoulder s' on the inside of the flange of the wall of the wheel. On each wheel is also provided indentations N'', and these indentations are graduated in depth to provide for the proper action of the fingers of the forked pawls. These indentations are seen in Figs. 8, 9, and 10, and vary according to requirements of the arithmetic in each case. These numbering-wheels are provided with peripheral stop-pins p, and along the series of wheels extends a stop-bar p', which is mounted upon pivoted arms p'', and is designed when moved into proper position to engage the stop-pins of the wheels, so that they can be turned to show "0" at the sight-slot of the incasement. The bar may be held in its stopping position by means of the lever device I', pivoted to the end of the frame, as shown in Fig. 1. Said stop-bar is held normally out of engagement with the stop-pins of the numbering or itemizing wheels by means of a spring S, so that the wheels may be subject to the action of the forked pawls of the keys.

In the construction shown the stop-bar is carried upon a pivoted or movable frame P, which is provided with upper and lower grooved bars P' P'', engaging the upper and lower roller r of the series of vertical slides R, which are designed to prevent more than one key being operated at a time. To this end these slides are arranged side by side and have just enough play to allow one key-lever to pass downward between its adjacent slides, this action crowding the other slides of the series on each side of the key close together, and thereby preventing any other key from being moved downward. The slides are reduced laterally at their upper ends to provide for the reception of the key-levers in normal position. Below their reduced portions the space occupied by the series of slides is equal to the entire interval of the side bars of the frame, less the width of one key-lever. The series of slides also close up the intervals between the key-levers and serve to prevent the casual introduction of anything which might clog or hinder the machine from working. These numbering or itemizing wheels are also provided with a series of spring-holding pawls r' to prevent their movement, except when actuated by the forked pawls of the key-levers.

In the rear of and above the series of multiplying-wheels and the series of adding-wheels is arranged the series of indicating-disks J, which are loosely mounted on a shaft Y. On these indicating wheels or disks are marked symbols or numbers corresponding to the value-marks of the keys, said symbols or numbers being of large size, so as to be readily seen when a disk is turned sufficiently to bring such number to the front or rear, or both, as it is preferred to have the numbers marked in duplicate on the disks, so as to show in rear as well as in front.

Each indicating-wheel is provided with a projection or arm $v$, which in the normal position of the disk—that is, when it shows a blank at the sight-slot—extends downward in front of the oblique upper projection $a''$ of the key-lever end. When a key is actuated, its projection $a''$, striking the arm of the disk, turns said disk sufficiently as to bring its number in proper position to be seen. At the same time a tooth $v'$ of the disk is engaged by a swinging angular pawl-bar V, so that the disk is held in position with its number showing until the next key is operated, this action moving the lower arm $v''$ of the pawl-bar, which extends along the entire line of keys in rear, outward by means of the pivoted trip-bar $c'$ of the key-lever, so that the disk becomes disengaged and is preferably returned to its normal position by a spring-bail $V^3$ common to all the wheels.

The machine, it will be seen, is of simple construction and is designed to be effective in its operation. By the action of a key its amount will be shown plainly on the indicating-disk and will be added to such previous amounts as have been struck. At the same time a registration will be kept of the multiplied transactions of each separate key. The full action of each key is insured, and as but one key can be operated at a time much liability to error from haste is obviated.

In lieu of the stop-bar that regulates the extent of the downward stroke of each of the key-levers there may be arranged a series of type or a type-plate $t$, representing the figures corresponding to the denomination of each of the keys underneath which this type or plate is located, and from underneath the finger extremity of each of the key-levers there is arranged a downward projection $t'$, with a surface suitable for engaging upon the type or type-plate and making an impression when said key-levers shall have been depressed the entire length of their stroke. The object of this arrangement is to enable one to print a ticket by inserting same under a key that is being operated and at the same time to cause said type or type-plate to act as a stop-bar, limiting the extent of the downward stroke. Instead of the above arrangement, however, the type may be affixed to the key-lever toward the finger extremity of said key-lever and a bar placed underneath same at a location to arrest the downward stroke at the proper place and of such form as to yield an impression from the type coming in contact with same.

Having described the invention, what I claim, and desire to secure by Letters Patent, is—

1. In an accounting-machine, the combination, with a series of key-levers, each having an arc ratchet and a trip at each end of said ratchet, and an upwardly-extending spring-actuated forked pawl, of a continuous triangular pawl and a series of springs acting, respectively, upon said pawl, a series of numbered multiplying-wheels and their connections, a series of indicating-disks, each mounted loosely on a shaft and having a downwardly-extending arm and a holding-tooth, the common pawl-bar, and a releasing-trip to disengage the same, substantially as specified.

2. In an accounting-machine, the combination, with a series of key-levers, each having an upwardly-extending spring-actuated pawl and an arc ratchet provided with a trip at each extremity of said ratchet, of a continuous triangular pawl having a double-acting spring engaging its apex, numbered multiplying-wheels and their connections, a stop-bar for limiting the downward stroke common to all said key-levers, a series of indicating-disks, each mounted loosely on a shaft and having a downwardly-extending arm and a holding-tooth, the common pawl-bar, and a trip to disengage the same, substantially as specified.

3. In an accounting-machine, the combination, with a series of key-levers, each having a finger-piece, an upwardly-extending spring-actuated forked pawl, and an arc ratchet provided with a trip at each extremity, of a continuous triangular pawl, double-acting springs therefor, a series of sets of numbered multiplying-wheels and their connections, a spring-actuated bar common to all and engaging all said key-levers for bringing the same back to their normal position, a series of indicating-disks, each mounted loosely on a shaft and having a downwardly-extending arm and a holding-tooth, the common pawl-bar, and a trip to disengage the same, and a returning device, substantially as specified.

4. In an accounting-machine, the combination, with a series of key-levers, each having a finger-piece, an upwardly-extending spring-actuated forked pawl, and an arc ratchet having a trip at each extremity, of a continuous triangular pawl having a double-acting spring engaging its apex, a series of sets of numbered multiplying-wheels and their connections, a series of vertical slides having rollers at their upper and lower ends between two grooved bars connected by a supporting-arm at each end, a series of indicating-disks, each mounted loosely on a shaft and having a downwardly-extending arm and a holding-tooth, the common pawl-bar, and a releasing-trip to disengage the same, and a returning device, substantially as specified.

5. In an accounting-machine, the combination, with a series of key-levers, each having a finger-piece, an upwardly-extending spring-actuated forked pawl, and an arc ratchet having a trip at each extremity, of a continuous triangular pawl, a series of double-acting springs engaging the same, a series of sets of numbered multiplying-wheels and their connections, a series of vertical slides having rollers at their upper and lower ends between two grooved bars connected by a supporting-arm at each end, a series of indicating-disks, each mounted loosely on a shaft and having a downwardly-extending arm and a holding-tooth, the common pawl-bar, and a releasing-trip to disengage the same, substantially as specified.

6. In an accounting-machine, the combination, with a series of key-levers, each having a finger-piece, an upwardly-extending spring-actuated forked pawl, and an arc ratchet having a trip at each extremity, of a continuous triangular pawl, a series of double-acting springs engaging the same, a series of sets of numbered multiplying-wheels and their connections, a series of vertical slides having rollers at their upper and lower ends between two grooved bars connected by a supporting-arm at each end, with a stop-bar for limiting the downward stroke common to all said keys for bringing the same back to their normal position, a series of indicating-disks, each mounted loosely on a shaft and having a downwardly-extending arm and a holding-tooth, the common pawl-bar, and a releasing-trip to disengage the same, substantially as specified.

7. In an accounting-machine, the combination, with a series of key-levers, each having a finger-piece, and an arc ratchet having a trip at each extremity, of a continuous triangular pawl, a series of double-acting springs engaging the same, a toothed wheel and transverse bail-lever and pawl common to all said key-levers, a series of adding-wheels, the toothed gearing attached thereto, their spur-like projections, the carrying-pinions and a stop-bar adapted to engage with said adding-wheels, a series of indicating-disks, each mounted loosely on a shaft and having a downwardly-extending arm and a holding-tooth, the common pawl-bar, and a releasing-trip to disengage the same, substantially as specified.

8. In an accounting-machine, the combination, with a series of key-levers, each having a finger-piece, an upwardly-extending spring-actuated forked pawl, and an arc ratchet having a trip at each extremity, of a continuous triangular pawl, a series of double-acting springs engaging said pawl, a series of sets of numbered multiplying-wheels and their connections, a toothed wheel, a transverse bail-lever and pawl common to all said key-levers, a series of adding-wheels and toothed gearing attached thereto, a series of carrying-pinions, a stop mechanism for said adding-wheels, a series of indicating-disks, each mounted loosely on a shaft and having a downwardly-extending arm and a holding-tooth, the common pawl-bar, and releasing-trip to disengage the same, substantially as specified.

9. In an accounting-machine, the combination, with a series of key-levers, each having a finger-piece, an upwardly-extending spring-actuated forked pawl, and an arc ratchet having a trip at each extremity, of a continuous triangular pawl, a series of double-acting springs engaging the same, a series of sets of numbered multiplying-wheels and their connections, a toothed wheel, transverse bail-lever and a pawl attached thereto actuating said wheel, a series of adding-wheels and toothed gearing attached thereto, a series of carrying-pinions, and a stop device for said adding-wheels, a series of indicating-disks, each mounted loosely on a shaft and having a downwardly-extending arm and a holding-tooth, the common pawl-bar, and the releasing-trip to disengage the same, substantially as specified.

10. In an accounting-machine, the combination, with a series of key-levers, each having a finger-piece, an upwardly-extending spring-actuated forked pawl, and an arc ratchet having a trip at each extremity, of a continuous triangular pawl, a series of double-acting springs engaging the same, a series of sets of numbered multiplying-wheels and their connections, a series of vertical slides having rollers at their upper and lower ends between two grooved bars, connected by a supporting arm or bar at each end, a toothed wheel and transverse bail-lever and pawl common to all said key-levers, a series of adding-wheels and toothed gearing attached thereto, a series of carrying-pinions, and a stop device adapted to engage with the adding-wheels, a series of indicating-disks, each mounted loosely on a shaft and having a downwardly-extending arm and a holding-tooth, the common pawl-bar, and the releasing-trip to disengage the same, substantially as specified.

11. In an accounting-machine, the combination, with a series of key-levers, each having a finger-piece, an upwardly-extending spring-actuated forked pawl, and an arc ratchet having a trip at each extremity, of a continuous double pawl, a series of double-acting springs engaging the same, a series of sets of numbered multiplying-wheels and their connections, a series of vertical slides having rollers at their upper and lower ends between two grooved bars connected by supporting-arm at each end, a stop-bar for regulating the extent of the downward stroke common to all of said keys, a toothed wheel and transverse bail-lever and pawl common to all said key-levers, a series of adding-wheels and toothed gearing attached thereto, a series of carrying-pinions and stop mechanism adapted to engage with said adding-wheel, a series of indicating-disks, each mounted loosely on a shaft and having a downwardly-extending arm and a holding-tooth, the common-pawl bar, and a releasing-trip to disengage the same, substantially as specified.

12. In an accounting-machine, the combination, with a series of key-levers, each having a finger-piece, an upwardly-extending spring-actuated forked pawl, and an arc ratchet having a trip at each extremity, of a continuous double pawl, a series of double-acting springs engaging the same, a series of sets of numbered multiplying-wheels and their connections, a series of vertical slides, each having a roller at each extremity, said slides being located between the two grooved bars connected by a supporting-arm at each end with a spring-actuated bar common to and engaging all said keys for bringing same back to their normal position, of a toothed wheel, a transverse bail-lever and pawl common to all said key-levers, a series of adding-wheels and toothed gearing attached thereto, a series of carrying-pinions and stop mechanism adapted to engage with said adding-wheels, a series of indicating-disks, each mounted loosely on a shaft and having a downwardly-extending arm and a holding-tooth, the common pawl-bar, and a releasing-trip to disengage the same, substantially as specified.

13. In an accounting-machine, the combination, with the adding mechanism, the indicator-disks, and the sets of numbering-wheels, of the key-levers, the trip-frame resting thereon, the continuous triangular pawl, its double-acting springs, the common pawl-bar, and the pivoted frame carrying the vertical slides for preventing more than one key from being operated at a time, substantially as specified.

In testimony whereof I affix my signature in presence of two witnesses.

HENRY G. O'NEILL.

Witnesses:
PHILIP C. MASI,
CHAS. L. TAYLOR.